(12) United States Patent
Munson et al.

(10) Patent No.: US 7,720,904 B2
(45) Date of Patent: May 18, 2010

(54) ENTITY PROJECTION

(75) Inventors: Ryan A. Munson, Fargo, ND (US);
Jeffrey R. Anderson, West Fargo, ND (US); John A. Healy, West Fargo, ND (US); Josh W. Honeyman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1372 days.

(21) Appl. No.: 11/139,746

(22) Filed: May 27, 2005

(65) Prior Publication Data

US 2006/0271382 A1     Nov. 30, 2006

(51) Int. Cl.
*G06F 15/16* (2006.01)
*G06F 7/00* (2006.01)
*G06F 9/44* (2006.01)

(52) U.S. Cl. .................. 709/201; 709/246; 707/103 R; 717/120

(58) Field of Classification Search .......... 705/1
See application file for complete search history.

(56) References Cited

U.S. PATENT DOCUMENTS

| | | | | |
|---|---|---|---|---|
| 5,497,491 A * | 3/1996 | Mitchell et al. | ............. | 719/315 |
| 5,680,563 A * | 10/1997 | Edelman | ............. | 715/835 |
| 5,713,021 A * | 1/1998 | Kondo et al. | ............. | 707/103 R |
| 5,826,268 A * | 10/1998 | Schaefer et al. | ............. | 707/9 |
| 5,913,032 A * | 6/1999 | Schwartz et al. | ............. | 709/213 |
| 6,128,619 A * | 10/2000 | Fogarasi et al. | ............. | 707/102 |
| 6,134,540 A * | 10/2000 | Carey et al. | ............. | 707/2 |
| 6,141,595 A * | 10/2000 | Gloudeman et al. | ............. | 700/83 |
| 6,212,672 B1 * | 4/2001 | Keller et al. | ............. | 717/104 |
| 6,321,236 B1 * | 11/2001 | Zollinger et al. | ............. | 707/203 |
| 6,418,428 B1 * | 7/2002 | Bosch et al. | ............. | 707/2 |
| 6,457,020 B1 * | 9/2002 | Carey et al. | ............. | 707/103 R |
| 6,460,058 B2 * | 10/2002 | Koppolu et al. | ............. | 715/738 |
| 6,499,036 B1 * | 12/2002 | Gurevich | ............. | 707/103 R |
| 6,539,397 B1 * | 3/2003 | Doan et al. | ............. | 707/103 R |
| 6,601,072 B1 * | 7/2003 | Gerken, III | ............. | 707/103 R |
| 6,631,519 B1 * | 10/2003 | Nicholson et al. | ............. | 717/169 |
| 6,633,312 B1 * | 10/2003 | Rochford et al. | ............. | 715/736 |
| 6,671,687 B1 * | 12/2003 | Pederson et al. | ............. | 707/9 |
| 6,678,882 B1 * | 1/2004 | Hurley et al. | ............. | 717/121 |

(Continued)

FOREIGN PATENT DOCUMENTS

GB     2377044 A   * 12/2002

(Continued)

OTHER PUBLICATIONS

WebSphere Product Center: 5.0.1.0verview (Sep. 2004).*

(Continued)

*Primary Examiner*—Saleh Najjar
*Assistant Examiner*—Robert Shaw
(74) *Attorney, Agent, or Firm*—Joseph R. Kelly; Westman, Champlin & Kelly, P.A.

(57) ABSTRACT

The present invention provides an entity projection in a client. The entity projection is an encapsulation of data, from an owning service, and residing on a consumer of that service. The entity projection provides an abstraction that conforms to an entity programming model on the consumer. The entity projection may illustratively include a subset of the properties of an entity in the owning service, the subset being only those properties required by the entity and those properties desired by the consumer.

7 Claims, 7 Drawing Sheets

U.S. PATENT DOCUMENTS

| | | | |
|---|---|---|---|
| 6,701,381 B2* | 3/2004 | Hearne et al. | 719/313 |
| 6,847,974 B2* | 1/2005 | Wachtel | 707/101 |
| 6,978,423 B2* | 12/2005 | Seetharaman et al. | 715/764 |
| 6,986,120 B2* | 1/2006 | Reddy et al. | 717/104 |
| 7,165,101 B2* | 1/2007 | Daniels et al. | 709/223 |
| 2001/0042016 A1* | 11/2001 | Muyres et al. | 705/14 |
| 2002/0091990 A1* | 7/2002 | Little et al. | 717/105 |
| 2002/0116454 A1* | 8/2002 | Dyla et al. | 709/203 |
| 2002/0129175 A1* | 9/2002 | Banavar et al. | 709/310 |
| 2002/0161861 A1* | 10/2002 | Greuel | 709/220 |
| 2002/0184401 A1* | 12/2002 | Kadel et al. | 709/315 |
| 2003/0149707 A1* | 8/2003 | Helmbrecht et al. | 707/104.1 |
| 2003/0187813 A1* | 10/2003 | Goldman et al. | 707/1 |
| 2004/0015564 A1* | 1/2004 | Williams | 709/219 |
| 2004/0060002 A1* | 3/2004 | Lucovsky et al. | 715/513 |
| 2004/0088365 A1* | 5/2004 | Gadbois et al. | 709/213 |
| 2004/0093580 A1* | 5/2004 | Carson et al. | 717/101 |
| 2004/0117393 A1* | 6/2004 | DeMesa et al. | 707/100 |
| 2004/0172618 A1* | 9/2004 | Marvin | 717/116 |
| 2004/0177028 A1* | 9/2004 | Francis et al. | 705/37 |
| 2004/0205086 A1* | 10/2004 | Harvey et al. | 707/103 R |
| 2004/0230328 A1* | 11/2004 | Armstrong et al. | 700/83 |
| 2004/0254884 A1* | 12/2004 | Haber et al. | 705/51 |
| 2005/0108169 A1* | 5/2005 | Balasubramanian et al. | 705/50 |
| 2005/0251556 A1* | 11/2005 | Ginis et al. | 709/206 |
| 2006/0015811 A1* | 1/2006 | Tanaka et al. | 715/531 |
| 2006/0047679 A1* | 3/2006 | Purdy et al. | 707/102 |
| 2006/0069693 A1* | 3/2006 | DelGaudio et al. | 707/101 |
| 2006/0122971 A1* | 6/2006 | Berg et al. | 707/3 |
| 2006/0136931 A1* | 6/2006 | Sever et al. | 719/313 |
| 2006/0161521 A1* | 7/2006 | Dettinger et al. | 707/3 |
| 2006/0179146 A1* | 8/2006 | Marucheck et al. | 709/227 |
| 2006/0236307 A1* | 10/2006 | Debruin et al. | 717/117 |
| 2006/0248121 A1* | 11/2006 | Cacenco et al. | 707/200 |

OTHER PUBLICATIONS

Webspherre Product Center: 5.0.1 Scripting Reference Guide (Sep. 2004).*

Matt Gullett, The Entity Design Pattern, The Code Project, Posted: Jun. 8, 2003 http://www.codeproject.com/KB/architecture/entitydesignpattern.aspx.*

Scholl et al. Updatable Views in Object-Oriented Databases, Deductive and Object-Oriented Databases, Lecture Notes in Computer Science, Springer Berlin / Heidelberg, vol. 566 (1991), p. 190-207 ISBN:978-3-540-55015-0.*

Hibernate Documentation (2004) http://web.archive.org/web/20040217122456/http://www.hibernate.org/5.html.*

Pemberton et al, W3C XForms 1.0, Feb. 2001.*

M. Stearns & G.Piccinelli, Managing Interaction Concerns in Web-Service Systems Proceedings of the 22nd International Conference on Distributed Computing Systems Workshops (ICDCSW'02) 0-7695-1588-6/02 © 2002 IEEE http://ieeexplore.ieee.org/stamp/stamp.jsp?arnumber=1030807&isnumber=22138.*

Foster, et al., Modeling Stateful Resources with Web Services, Version 1.1 Mar. 5, 2004, © Copyright Computer Associates International, Inc., Fujitsu Limited, Hewlett-Packard Development Company, International Business Machines Corporation and The University of Chicago 2003, 2004.*

OMG CORBA V2.3 Specification Dec. 1998.*

Curbera et al, Unraveling the Web Services Web: An Introduction to SOAP, WSDL and UDDI Internet Computing, Mar.-Apr. 2002.*

Dan Box, "Code Name Indigo A Guide to Developing and Running Connected Systems with Indigo", msdn Magazine, Jan. 2004.

* cited by examiner

ENTITY PROJECTION

BACKGROUND OF THE INVENTION

The present invention deals with entities in service oriented systems. More specifically, the present invention deals with the generation of a projection of an entity, owned by an owning service, on a consumer (which may also be a service) in a service oriented system.

A service is a system that a consumer of the service interacts with through a set of coarse-grained messages. A service oriented application may be composed of one or more services. Each of these application services typically contains a set of entities. Entities, in general, encapsulate data and provide a rich programming model for creating, reading, updating and deleting the data owned by the service.

Services typically contain private data and public data. The private data is encapsulated in an internal entity so that, within the service, the programming model provides access to all of the data and associations contained in the internal entity, but external to the service, the internal entity is not exposed through the service interface. However, public data is encapsulated in a publicly available entity which is available to consumers of the service.

It is common for a consumer of a service to access data of an entity owned by the service. One prior way for enabling this had the consumer directly access the owning service's data store. However, direct access to the owning service's data store requires the consumer of the data to have knowledge of the technology and table structure used by the owning service to store data in its data store. Similarly, such direct access allows the consumer to potentially view and change private data within the service. This is problematic for a number of reasons, and is discouraged in applications that honor the publicly known tenets of service orientation. These are set out in an article by Don Box entitled Code Name Indigo: A Guide to Developing and Running Connected Systems with Indigo, MSDN Magazine, January 2004. Basically, allowing an external service or client to bind directly to the owning service's data (either by access to the service's private entities or by directly accessing the data store which the service stores its data in) is a technique that compromises data integrity, the autonomy, and the explicit boundaries of the service in a service oriented environment. Instead, all communication with a service should occur using standardized message exchange.

In addition, many developers wish to develop systems in which the services are autonomous. Synchronizing and replicating data locally to the consumers of the service is often done to achieve such autonomy, because a given service does not then require the owning service to be available to retrieve data and process requests. However, a consumer may only be interested in a subset of the properties of the entity in the owning service.

In the past, in order to access only part of an entity, the consumer was required to have table-level access to the data in the owning service (which violates the tenets of service orientation as mentioned above), or it had to request the entire entity through the owning service's interface. Of course, an entity may have a very large number of properties (often in the hundreds) and a consumer may only require access to a very small number (such as five) of the properties. The consumer will normally not wish to incur all the overhead for processing such a large data set, when it only needs a small subset of the data.

This becomes even more important if functionality is provided to synchronize associated data to a local data store. Synchronization is the process through which data is replicated to a local data store and maintained by applying changes made to the owning service's data store to the consumer's data store. For instance, a consumer may wish to periodically synchronize a subset of the data from the owning service's data store to its own local data store. The consumer's local data store may be remote from the owning service's data store and may even be on a laptop computer or other mobile device. If the consumer is required to synchronize unwanted properties of an entity, this can greatly increase the amount of time and processing overhead required to perform the synchronization process. Further, when bringing a consumer on line, the initial synchronization of data can become burdensome and consume undesirable amounts of time and processing overhead.

Services also typically expose a plurality of publicly available data contracts. The data contracts identify the publicly available entities and the properties contained within those entities and specify how the entities are associated or related. Upon being queried through an interface, the service will generally provide access to data in the publicly available data contracts to the requestor.

SUMMARY OF THE INVENTION

The present invention provides an entity projection abstraction for use by consumers of a service. The entity projection is a read only encapsulation of data, residing on a consumer, and representing data from an owning service. The entity projection is an abstraction that conforms to an entity programming model on the client. The entity projection may illustratively include a subset of the properties of an entity in the owning service, the subset being only those properties required by the entity and those properties desired by the client.

DETAILED DESCRIPTION OF ILLUSTRATIVE EMBODIMENTS

The present invention deals with generating a projection of an entity, owned by an owning service, on a consumer of that data. The consumer may illustratively be a client, or another service. However, before describing the present invention in greater detail, one illustrative environment in which the present invention can be used will be described.

Figure 1:
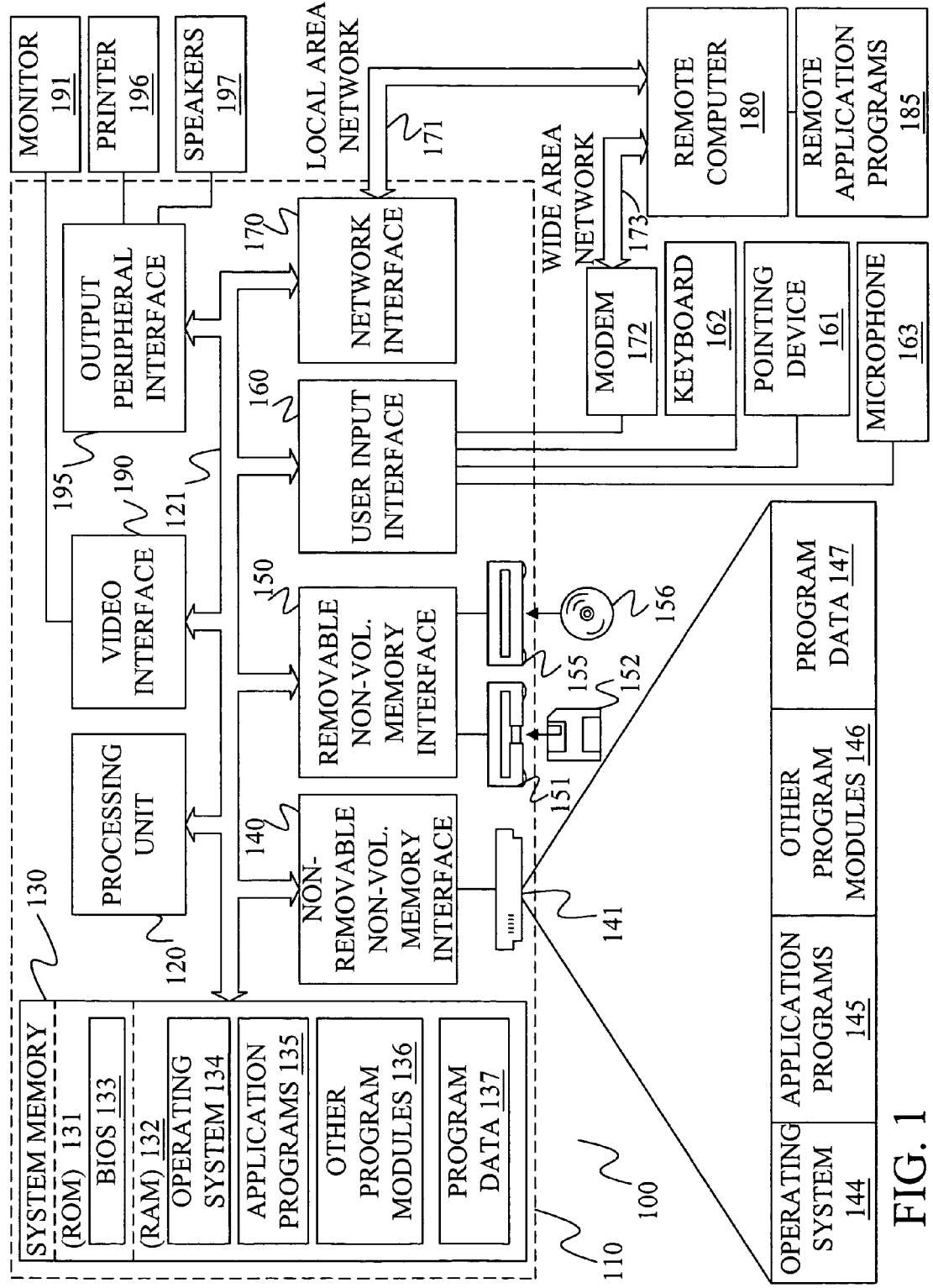
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
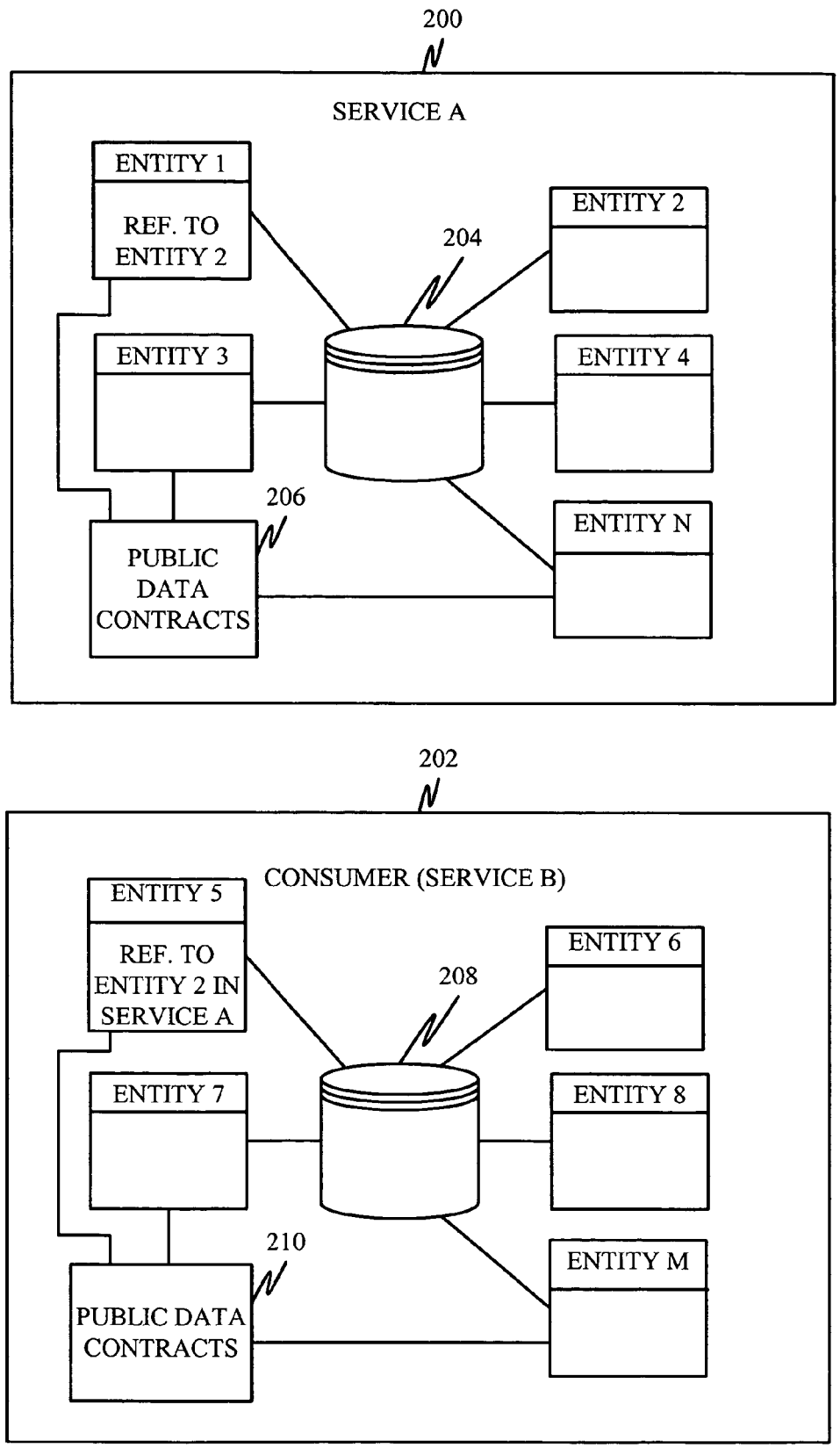
FIG. 2 is a block diagram of two services, each with entities and public data contracts.

FIG. 2 is a block diagram of two autonomous services, service A represented by numeral 200 and service B represented by numeral 202. Service A is shown with a plurality of entities (entity 1-entity N) that are stored in a data store 204 that is local to service A. FIG. 2 also shows that service A includes one or more public data contracts 206 that represent the entities, how they are related, and the publicly available properties in each of those entities. The data contracts in FIG. 2 are shown connected to a number of the entities for the sake of illustration. There may illustratively be one data contract per entity. However, the data contracts could be arranged in other ways as well.

Service B also includes a plurality of entities (entity 5-entity M) that are stored in a data store 208 that is local to service B. FIG. 2 also shows that service B includes one or more public data contracts 210 that describe the entities, the relationships between the entities, and the publicly available properties for the entities found in service B. For the sake of the present discussion, service B is referred to as the consumer 202. That is because service B includes an entity (entity 5) that has a reference to data owned by service A. For instance, entity 5 in service B might consume data encapsulated by entity 2 owned by service A. Therefore, service B is designated as the consumer 202 because it consumes data owned by another service. It will of course be noted that by consumer it is meant a service, application, entity, or other component that requires access to data in another service.

In prior systems, in order for service B to access the data in service A, a number of different techniques could be used. In a first technique, service B would require direct association to the entity in service A and/or the data stored in data store 204 in service A. This would lead to a number of problems which are discussed in the background portion of this description. Alternatively, service B, could query service A for all of entity 2, even though service B was only interested in a subset of the properties of entity 2 in service A. This also leads to disadvantages described in the background.

Figure 3A:
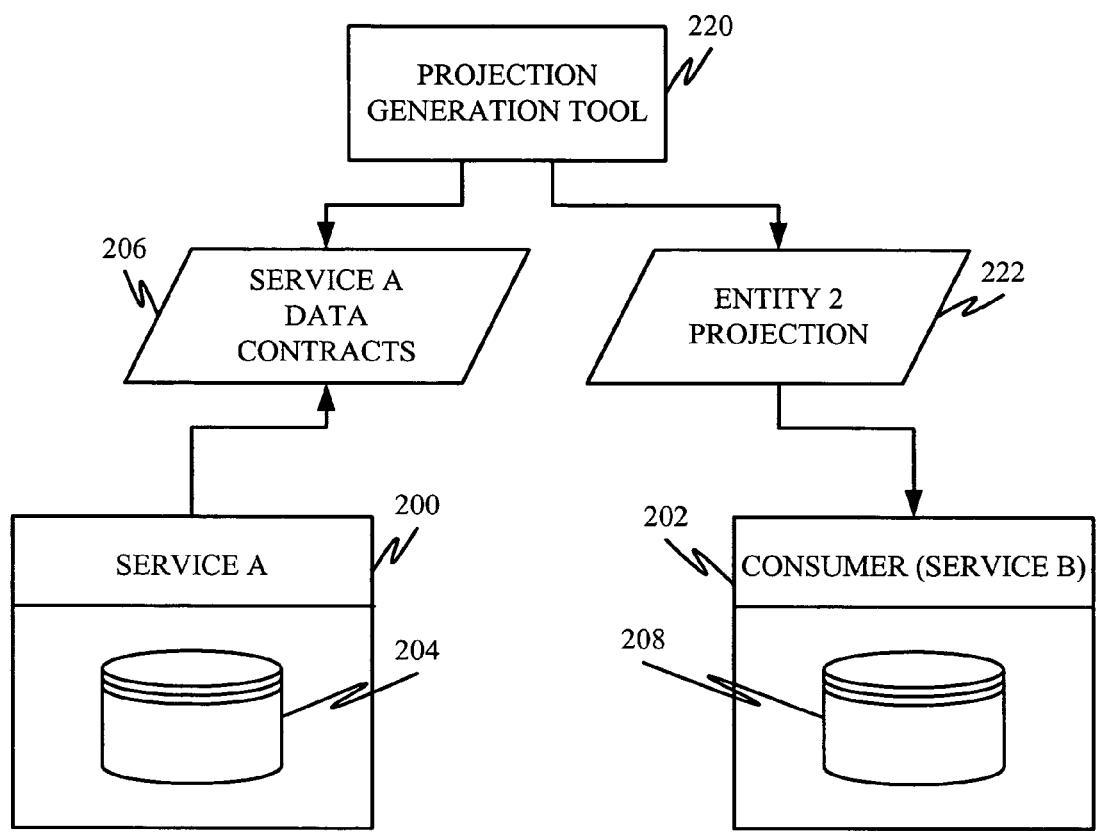
FIG. 3A illustrates a generation tool used for generating entity projections in accordance with one embodiment of the present invention.

FIG. 3A shows that the present invention provides a projection generation tool 220 that accesses the public data contracts 206 from service A and creates an entity projection 222, from the information stored in one or more contracts 206, and provides entity projection 222 to service B. The entity projection 222 will be a local abstraction to service B, but contain only the properties of entity 2 (from service A) that are required, and those that are desired by entity 5 in service B.

Figure 4:
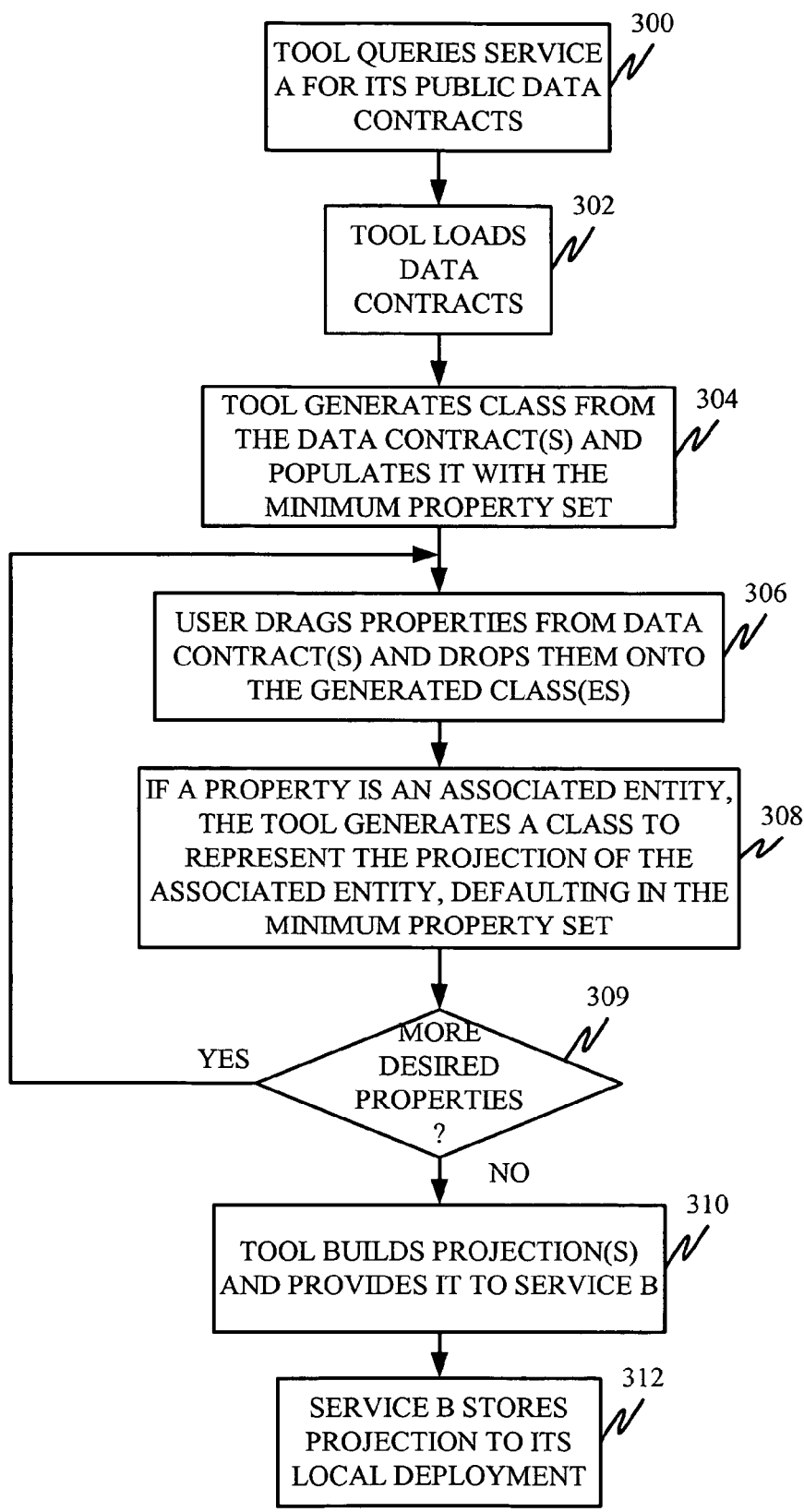
FIG. 4 is a flow diagram illustrating the operation of the tool shown in FIGS. 3A and 3B.

FIG. 4 is a flow diagram better illustrating the operation of the system shown in FIG. 3A. Tool 220 is illustratively configured to interact with services A and B through predetermined interfaces. In order to generate a projection, the present discussion will proceed with respect to entity 5 in service B requiring access to certain properties of entity 2 from service A. Therefore, tool 220 will generate an entity projection in service B of entity 2 from service A. Tool 220 initially queries service A for its public data contracts. This is indicated by block 300 in FIG. 4. Service A provides its data contracts 206 to tool 220, and tool 220 loads the data contracts. This is indicated by block 302 in FIG. 4.

Figure 5A:
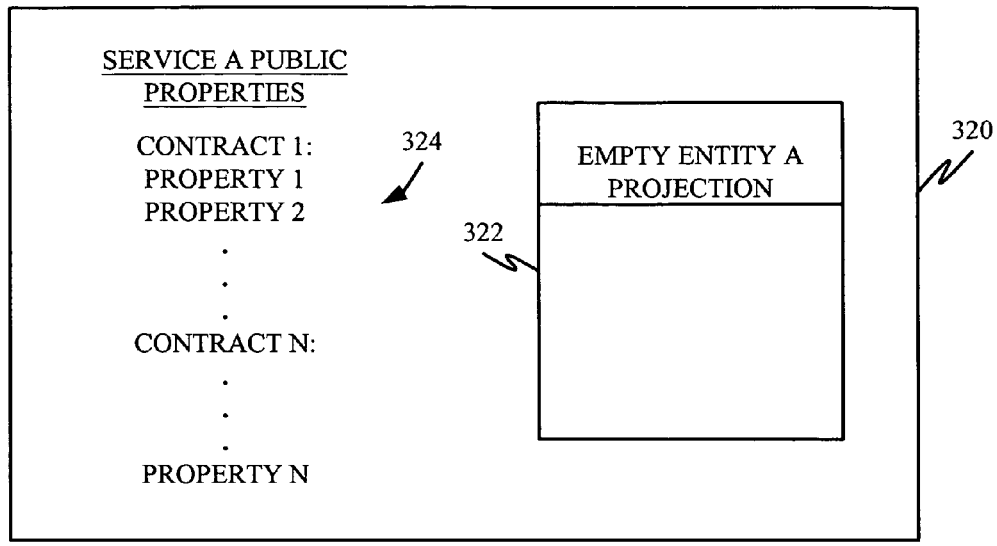
FIGS. 5A and 5B illustrate exemplary displays for allowing a user to create an entity projection from a public data contract.

Tool 220 then illustratively generates a class containing only the required properties based on the information set out in the publicly available data contracts 206. The generated class corresponds to the entity for which the projection is to be generated. FIG. 5A illustrates one illustrative embodiment of an interface display 320 illustrating this. The generated class is illustrated at 322 on display 320, and generating the class from the data contract is indicated by block 304 in FIG. 4.

FIG. 5A also shows, on the left half of the display, that tool 220 displays a list of the publicly available properties in the public data contract(s) from the relevant entities in service A. This is indicated generally at 324 in FIG. 5A.

Once this display 320 is generated, the user can simply drag properties from list 324 onto the generated entity class 322 in order to populate the entity class 322 with the desired properties. This is indicated by block 306 in FIG. 4.

The entity projection is thus a read-only entity abstraction that can be generated from the data contract for an entity exposed by another service. The projection can include any number of properties exposed from the owning entity's contract, including the required fields (minimum set of properties) of the entity. The entity projections provide read functionality as does any other entity, but can be totally generated based on the data contract of another entity.

Figure 3B:
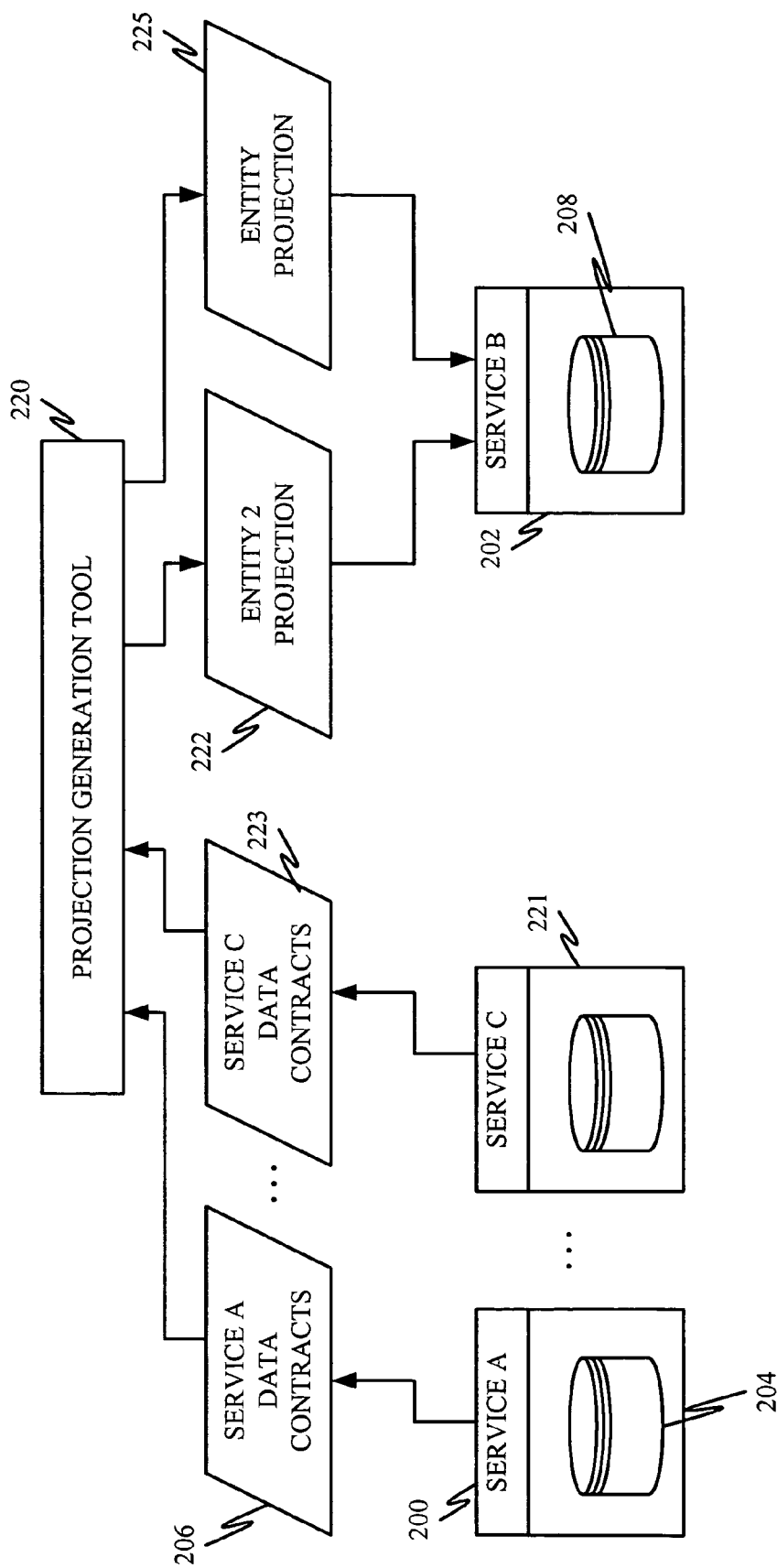
FIG. 3B illustrates the tools shown in FIG. 3A interacting with additional services.

It will also be noted that a service can contain multiple projections each of which can be generated from a different service, and compositions and associations can also be generated. For instance, FIG. 3B shows projection generation tool 220 generating entity projections for a consumer (service B) from not just a single service A, but from multiple services (service A and service C). The items that are similar to those shown in FIG. 3A are similarly numbered.

Figure 5B:
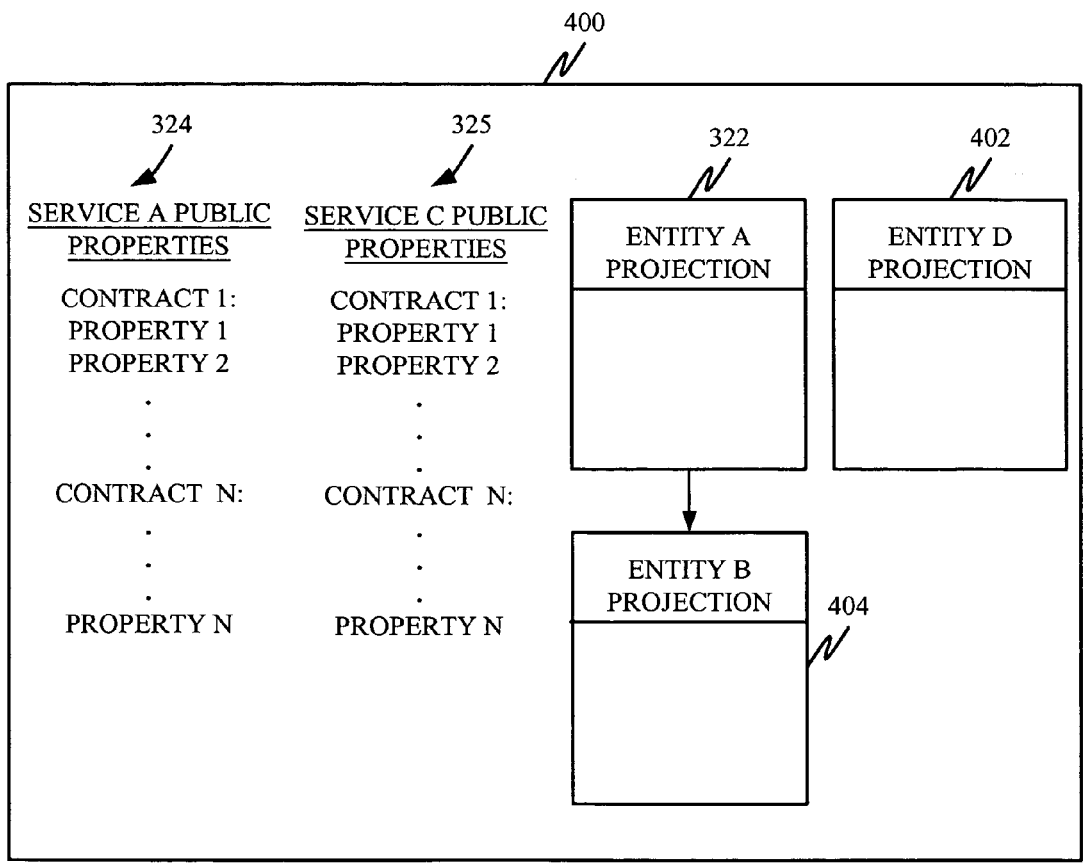

Service C shown in FIG. 3B is illustrated by numeral 221 and its publicly available data contracts are indicated by numeral 223. The entity projection from service C is indicated by numeral 225. Thus, service C makes its data contracts available to projection generation tool 220 which displays the publicly available properties in each data contract to the user. This is indicated by an illustrative display 400 shown in FIG. 5B. FIG. 5B illustrates that not only are the publicly available data contracts and publicly available properties for each contract from service A shown in list 324, but the publicly available data contracts and publicly available properties for each contract from service C are also shown in list 325.

FIG. 5B also shows that tool 220 has opened a plurality of generated classes. The first is class 322 which is described above. However, since service B illustratively requires data from service C, another generated entity projection 402 is opened by the tool and displayed to the user. Thus, the user can drag properties from lists 324 and 325 onto the generated classes 322 and 402, respectively.

It may also be that one of the properties dragged by the user may be an associated entity (i.e., an entity associated with the entity represented by a generated entity projection). For instance, if the user is populating the entity A projection 322 with properties, and the user drags a property that is actually an entity that is associated with entity A, then tool 220 generates a class for the associated entity projection and populates it with the minimum property set. In the illustrated embodiment, entity B is associated with entity A and therefore an entity B projection is generated. This is designated by numeral 404 in FIG. 5B. Generating an entity projection to represent the class of the associated entity is indicated by block 308 in FIG. 4. This can happen recursively, since associated entities can have associations to other entities. This is indicated by block 309 in FIG. 4.

Once all of the desired generated class projections have been populated with properties from the user, the tool simply builds the entity projections and deploys them to the requesting service, in this case service B. This is indicated by block 310 in FIG. 4. Service B then stores data encapsulated by the projections in its local data store 208. This is indicated by block 312 in FIG. 4.

Figure 6:
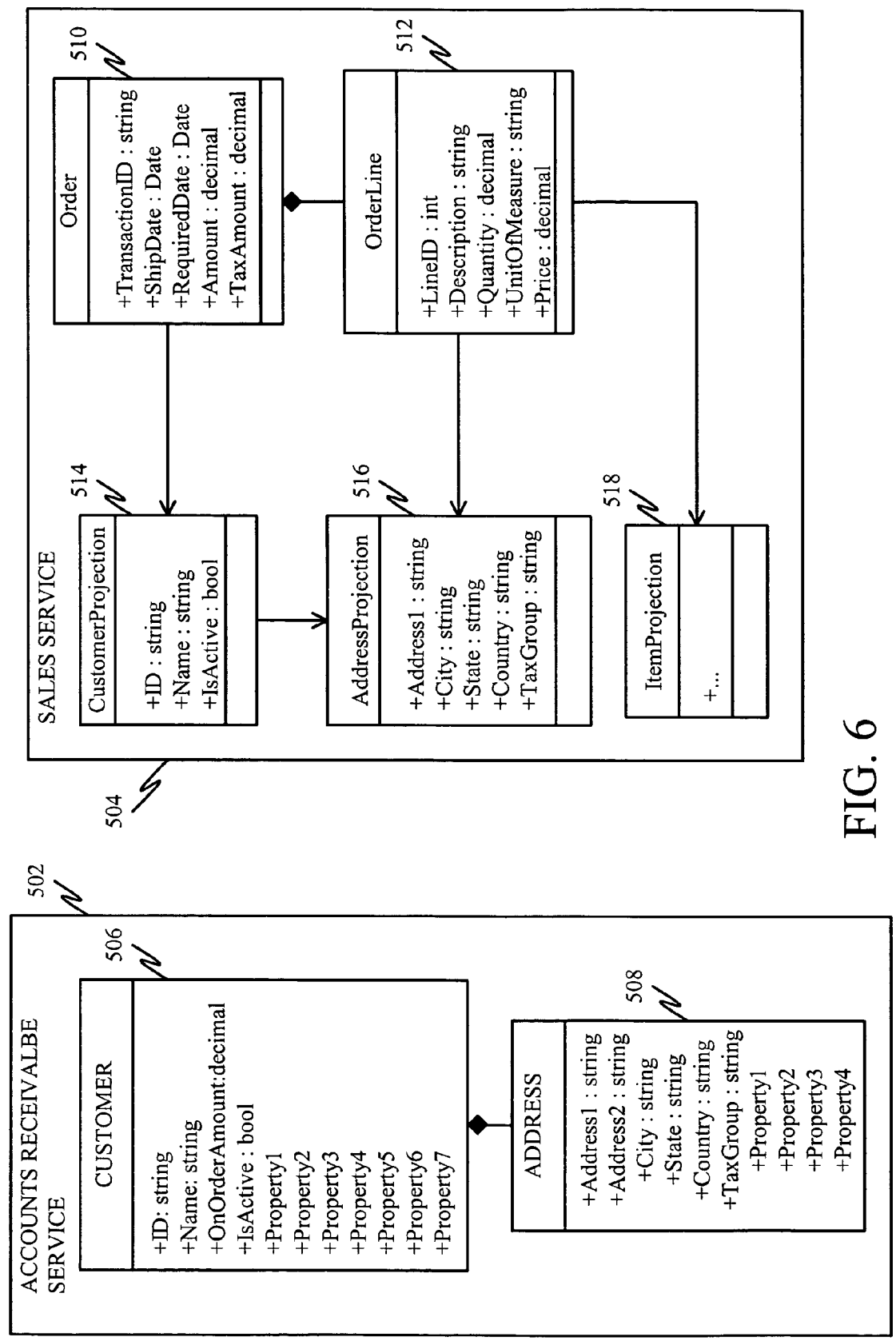
FIG. 6 shows a more detailed embodiment of two services, their corresponding entities, and entity projections.

FIG. 6 illustrates a more concrete embodiment of the present invention. FIG. 6 shows accounts receivable service 502 and sales service 504. Accounts receivable service 502 has a plurality of entities represented by a UML diagram. Accounts receivable service 502 includes a customer entity 506 that has a composition of addresses represented by address entity 508. Customer entity 506 is shown with a plurality of properties that represent a customer. Of course, in an actual application, there may be a very large number of properties, perhaps in excess of 100 properties in a customer entity 506. Address entity 508 is associated with customer entity 506 and is also shown with a plurality of properties, but may in actuality have as many as 50 or more properties.

Sales service 504 is also shown with a plurality of entities represented in a UML diagram. Sales service 504 includes an order entity 510 and a composition of order line entities 512. It can be seen from the UML diagram that order entity 510 in sales service 504 requires a reference to the customer entity 506 in accounts receivable service 502. However, instead of directly referencing that entity in accounts receivable service 502, tool 220 has created customer projection 514. Only the required properties and the properties desired by sales service 504 are populated into projection 514. Therefore, order entity 510 in sales service 504 holds and association to the customer projection 514 which is also local to the sales service 504.

Further, FIG. 6 shows that associations between projections can also be generated. For instance, FIG. 6 shows the association of the customer projection 514 to address 516. Once customer projection 514 is created, if the user drags the address association property to it, then the address projection 516 is created as well.

FIG. 6 also shows that order line entity 512 has an association to the address entity. However, instead of directly referencing address entity 508 in accounts receivable services 502, tool 220 has set up address projection 516 in sales service 504. Both projections 514 and 516 are stored in the data store locally used by sales service 504. Therefore, projections 514 and 516 look as if they are locally owned entities, even though they are actually owned by a separate service.

FIG. 6 also shows that order line entity 512 has an association to the item projection 518. In one illustrative embodiment, item projection 518 is an entity projection that comes from a service different from projections 514 and 516, which come from accounts receivable service 502. In an illustrative embodiment, projection 518 comes from an inventory service, for example.

It will be noted that the entities and entity projections shown and discussed with respect to the present invention, as is generally known, have functionality that enables them to load information from a database, and they are not simply object classes with a few properties. Instead, as is known, entities are much richer.

In one illustrative embodiment the projections are read-only entities and have the data encapsulated therein synchronized to them from the owning services. Synchronization can be performed in any desired way and is not important for purposes of the present invention. In one embodiment, the entity projection can also be used to register for synchronization from another service as it represents the payload of the requested data.

By having this abstraction, the entity programming model stays intact whether the data is owned by one's service or whether one has replicated data from another service. From a programming model perspective, the difference between a local entity and an entity projection is not discernible. After the entity projection is created, other entities within the consuming service can then associate via typical entity association mechanisms with the projection. The projection can be queried using typical entity query mechanisms as well.

Thus, it can be seen that the present invention provides significant advantages over prior systems. Unlike prior systems which require direct access to data of an owning service's data store, the entity projection of present invention provides a way of encapsulating replicated reference data that has had internal data removed from it. The present invention also allows both services to be autonomous. In addition, the present invention allows the developer or author of the consuming service to choose only desired properties for a projection, and those are included in the projection in union with the required properties. This greatly reduces the amount of time required to synchronize data to the projection.

The present invention can also be used to associate two entities across services. Any given application may be comprised of many services. Therefore, in order to honor the autonomous nature of a service, the entity projection can be utilized to encapsulate the data local to the consuming service, and within the consuming service a strong association can then be made to the local entity projection. This preserves the query and entity programming models and also preserves autonomy among services. With the data local and encapsulated by an entity projection, the availability of the owning service does not affect the ability of the consuming service to continue to process requests.

Although the present invention has been described with reference to particular embodiments, workers skilled in the art will recognize that changes may be made in form and detail without departing from the spirit and scope of the invention.

What is claimed is:

1. A consumer service, which is a consumer of data from an owning service that owns the data, the owning service owning the data by creating an owned entity which is an encapsulation of the data and originating changes to the data, the consumer comprising:

an entity projection, being a read-only encapsulation of desired and required data from the owning service, the desired data being data which are used by the consumer service, and the required data being data required to access the entity in the owning service a computer processor, being a functional component of the consumer service, receiving the entity projection generated by an entity projection generation tool and storing the entity projection on a data store local to the consumer, wherein the entity protection is read-only the computer processor receiving changes to the desired data, originated at the owning service, and applying the changes to the entity projection on the consumer service, the computer processor accessing the desired data in the entity projection, for use by the consuming service, using read only portions of an entity programming model defining how data is manipulated and maintained;

wherein the data is represented by an internal entity, with corresponding properties, in the owning service, and wherein the properties in the entity projection comprise a desired subset of the properties of the internal entity in the owning service, the desired subset being specified by the consumer service.

2. The consumer service of claim 1 wherein the entity projection includes properties corresponding to data required by the entity projection and wherein said properties comprise an identity of the internal entity in the owning service.

3. The consumer service of claim 1 wherein the entity projection conforms to the entity programming model that is used on the consumer.

4. The consumer service of claim 1 further comprising:

a plurality of entity projections, each including properties representing desired data from a different one of a plurality of services.

5. The consumer service of claim 1 further comprising:

a plurality of associated entity projections, associated with one another and stored on a data store local to the consumer.

6. The consumer service of claim 1 wherein the consumer service consumes the desired data and creates data that is consumed by other consumer services.

7. A first service, comprising:

a plurality of entities having data accessed in accordance with an entity programming model, an entity being an encapsulation of the data; at least one of the entities being an entity projection and having a subset of data from an entity in a second service, the entity projection being a read-only encapsulation of desired and required data from the entity in the second service, the desired data being data used by the first service and a subset of the data in the entity in the second service, the subset specified by the first service, and the required data being data required to access the entity in the second service, wherein the desired and required data in the entity projection are stored in a data store local to the first service and a computer processor, being a functional component of the first service, receiving the entity projection generated by an entity projection generation tool using read-only portions of the entity programming model and storing the entity projection on the data store, in a read-only form so only changes originated by the second service are applied to the entity projection.

* * * * *